Nov. 8, 1955 D. L. CURTIS 2,723,080

TRIGGERING NETWORKS FOR FLIP-FLOP CIRCUITS

Filed Sept. 8, 1951 4 Sheets-Sheet 1

INVENTOR.
DANIEL L. CURTIS.
BY Nicholas T Volsk
atty.

Nov. 8, 1955 D. L. CURTIS 2,723,080

TRIGGERING NETWORKS FOR FLIP-FLOP CIRCUITS

Filed Sept. 8, 1951 4 Sheets-Sheet 2

INVENTOR.
DANIEL L. CURTIS.
BY Nicholas T Volk
atty.

Nov. 8, 1955 D. L. CURTIS 2,723,080

TRIGGERING NETWORKS FOR FLIP-FLOP CIRCUITS

Filed Sept. 8, 1951 4 Sheets-Sheet 3

INVENTOR.

DANIEL L. CURTIS.

BY Nicholas T Volk atty.

Nov. 8, 1955 D. L. CURTIS 2,723,080

TRIGGERING NETWORKS FOR FLIP-FLOP CIRCUITS

Filed Sept. 8, 1951 4 Sheets-Sheet 4

INVENTOR.
DANIEL L. CURTIS.
BY Nicholas T Volk
atty.

2,723,080

TRIGGERING NETWORKS FOR FLIP-FLOP CIRCUITS

Daniel L. Curtis, Venice, Calif., assignor, by mesne assignments, to Hughes Aircraft Company, a corporation of Delaware Application September 8, 1951, Serial No. 245,737

15 Claims. (Cl. 235—61)

This invention relates to triggering networks for a bistable multivibrator or flip-flop circuit and, more particularly, to a triggering network incorporated in one of the input circuits of a flip-flop, by which a first pulse delivered to the flip-flop triggers the flip-flop unless a second pulse is delivered simultaneously to the flip-flop, in which instance the flip-flop is triggered by the second pulse, the second pulse overriding the first pulse by action of the triggering network. Thus, triggering circuits provided by the present invention may be considered to be devices for rendering a bistable flip-flop having two input circuits responsive to a signal applied to one input circuit upon the simultaneous application of signals to both of the input circuits.

The flip-flop circuit and associated triggering networks disclosed by this invention have many applications, especially in the digital computer field. Digital computer circuits have, in the past, obtained the same result as that disclosed by this invention by employing rather complex electronic circuitry in association with flip-flop circuits. For example, one such circuit employs a vacuum tube inhibitor in one input circuit of the flip-flop, the inhibitor receiving both input pulses, and the other input circuit of the flip-flop receiving only one input pulse. If the input pulses are applied simultaneously, the same pulse applied to the other input circuit blocks the other pulse within the inhibitor tube by biasing the tube past cutoff thereby preventing the other pulse from being conducted through the inhibitor to the flip-flop input circuit. In such a case, the blocking pulse triggers the flip-flop. If the blocking pulse does not occur, the other pulse is conducted through the inhibitor to actuate the flip-flop. The inhibitors most generally utilized for this purpose contain at least one multigrid vacuum tube with appropriate associated circuitry, although other types of inhibitors have been devised which contain diode gating circuits of similar complexity.

This invention discloses triggering circuits of extremely simple design and construction to replace the rather complex inhibitors of the type noted above. The triggering circuits, according to this invention, are placed in one input circuit of a bistable flip-flop to change the time duration of any input pulses applied thereto. An input pulse, thus distorted by the triggering circuit, is still able to trigger the flip-flop. However, if a pulse of normal duration is applied to the input circuit of the flip-flop simultaneously with a distorted pulse, the flip-flop is triggered by only one of the pulses.

According to one embodiment of this invention, a triggering circuit, composed of passive circuit components, is serially connected to one of the flip-flop grids to differentiate the pulses of the input signal and, by rectification, apply only the negative portion thereof to the grid. Thus, any normally-shaped pulse, applied simultaneously to the other flip-flop grid is capable, by reason of its longer duration and larger amplitude, of overriding the differentiated pulse and triggering the flip-flop. On the other hand, if only the differentiated pulse is applied, it will trigger the flip-flop.

Another type of triggering circuit, according to this invention, includes an integrating network coupled to one of the grids of the flip-flop circuit which increases the time duration of any pulses applied thereto. Thus, any pulse applied to such a triggering circuit actuates the flip-flop by overriding any normally-shaped pulse applied simultaneously to the other grid. In the absence of an integrated pulse, the flip-flop will be actuated by a normally-shaped pulse applied to its other grid.

Another embodiment of this invention discloses a flip-flop wherein two triggering pulses, one positive and the other negative, are applied to the same grid. The positive pulse is conducted through a triggering circuit which sharpens it and accordingly permits the unsharpened negative pulse to actuate the flip-flop upon simultaneous occurrence of both pulses.

The flip-flop and triggering circuits of this invention are illustrated as forming a portion of a shifting register circuit as generally employed with digital computers. Shifting register circuits are utilized for quick access storage of numbers just prior to their further computation by the computer. Usually, the words are first stored on a long access memory device, such as a magnetic storage drum, etc., and then transferred to a shifting register circuit in which they are also stored, but are therein much more readily available for computations. The shifting register circuits as heretofore known and utilized have been greatly simplified by employing the flip-flop triggering circuits disclosed in this invention.

It will be apparent to those skilled in the art that the flip-flop and triggering circuits, according to this invention, have wide application in fields other than shifting registers. Accordingly, it is to be understood that the flip-flop and triggering units, according to this invention, are not limited in application to shifting register circuits alone.

It is, therefore, an object of this invention to provide a triggering network in one input circuit of a bistable flip-flop so that, if a pair of pulses are applied simultaneously to the flip-flop, one pulse will override the other pulse by reason of the triggering network and be solely effective to actuate the flip-flop.

Another object of this invention is to provide a circuit for sharpening the pulses applied to one input of a flip-flop circuit so that the flip-flop will be actuated thereby unless a pulse of normal duration is applied simultaneously to the other flip-flop input, in which case, the sharpened pulse will be overridden, and the flip-flop actuated in accordance with the normal pulse.

A further object of this invention is to provide a circuit for increasing the time duration of pulses applied to one grid of a flip-flop, which will override any pulses of normal duration simultaneously applied to the other grid and trigger the flip-flop.

A still further object of this invention is to provide a triggering network within one input circuit of a flip-flop, whereby one of two simultaneously occurring input pulses, applied to the two input circuits thereof, overrides the other, and, is solely effective in triggering the flip-flop.

Another object of this invention is to provide a triggering circuit coupled to one grid of a flip-flop which sharpens any positive pulse of normal duration applied thereto, said sharpened positive pulse serving to trigger the flip-flop unless a negative pulse of normal duration is simultaneously applied to the same grid, in which instance the flip-flop is triggered by the negative pulse.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
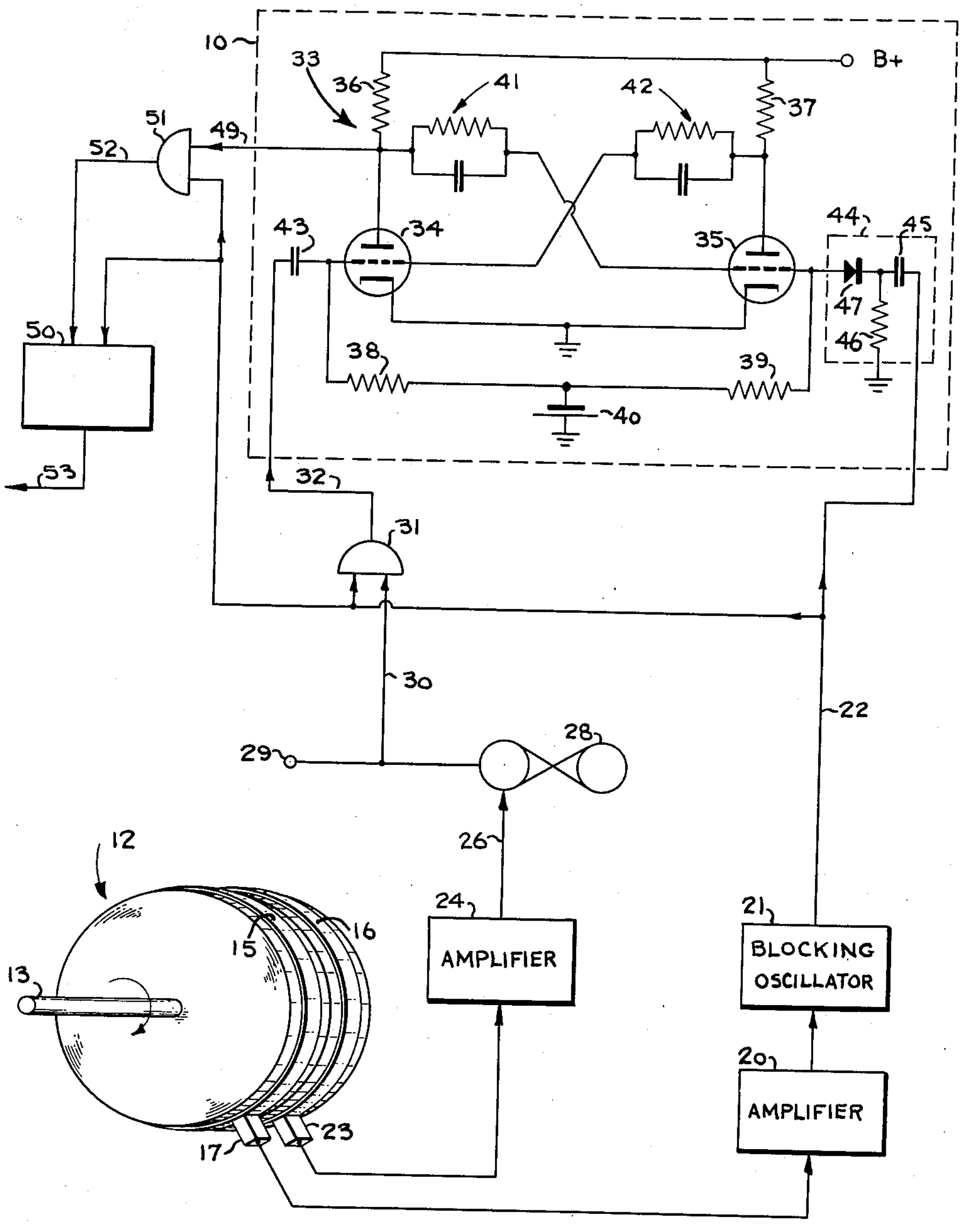
Fig. 1 is a circuit diagram of one embodiment of this invention.

Referring now to Fig. 1, there is illustrated the initial portion of a shifting register circuit of the general type commonly associated with digital computers. The shifting register, as shown, includes a conventional flip-flop 28, a flip-flop unit 10, and another flip-flop unit 50, identical to unit 10. This shifting register circuit is actuated by timing pulses and pulses representing binary digits which were previously stored in a cyclic storage medium, such as a magnetic storage drum 12, driven through a shaft 13 by any suitable source of rotary power (not shown). Drum 12 contains a first magnetic track 15, on which is magnetically recorded, a series of uniformly-spaced timing pulses. The recorded timing pulses are sensed by a transducer 17, amplified by an amplifier 20, and then utilized to trigger a blocking oscillator 21 whose output signal appears on conductor 22 in the form of sharp negative timing pulses, as generally designated 22' of Fig. 2.

Figure 2:
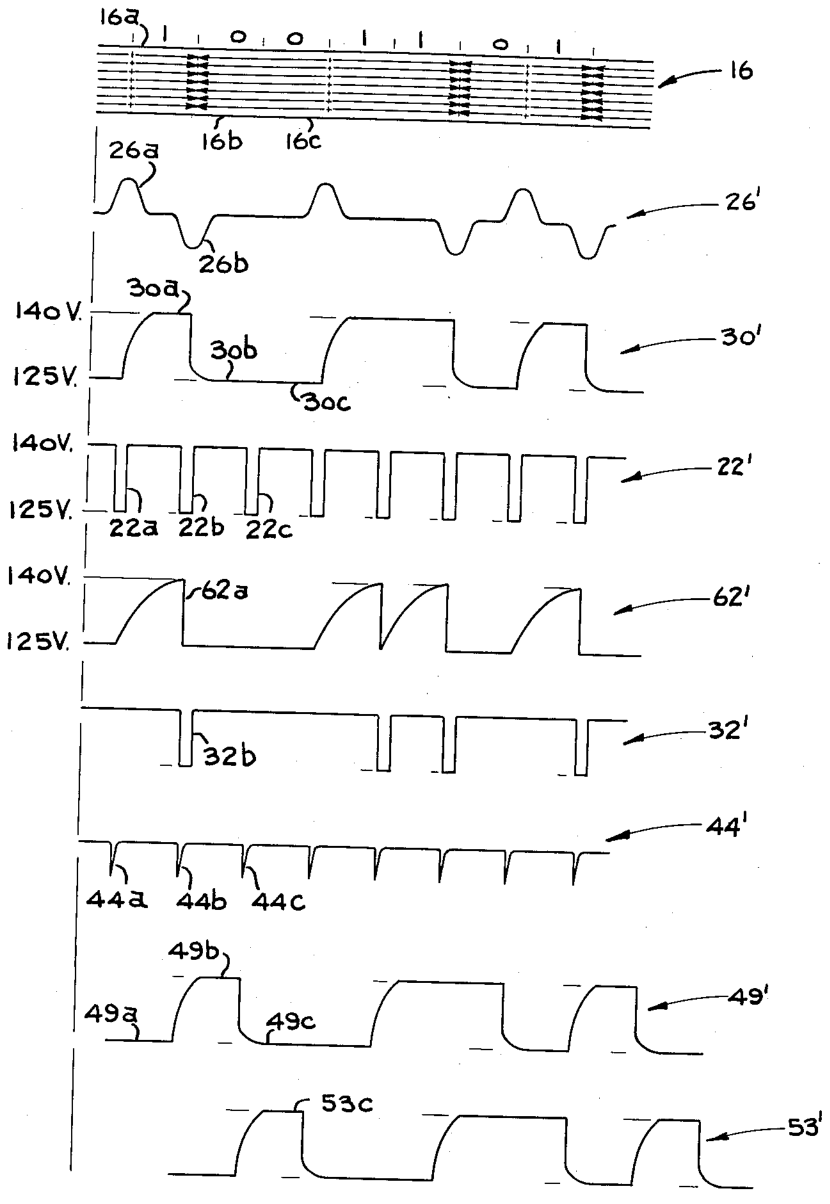
Fig. 2 is a group of signal waveforms illustrating the principle of operation of the embodiment of Fig. 1.

Drum 12 contains a second magnetic track 16 on which a sequence of binary digits has been magnetically recorded as illustrated, by way of example, by pattern 16 of Fig. 2. These digits were recorded in conventional fashion by orienting the poles of the magnetic material in either of two directions within discrete areas thereof to indicate thereby either binary digit 0 or 1, respectively. For example, the first area **16*a*, polarized in one direction, as illustrated in Fig. 2, represents the binary digit 1, while the next area 16*b***. polarized in the other direction, represents the binary digit 0. These recorded digits are to be impressed on the input of the shifting register so that they will be stored thereby and be available for additional computations by the computer.

Transducer 23, positioned adjacent track 16, senses the magnetic change occurring between adjacent oppositely magnetized areas and produces a corresponding signal. This signal is amplified by an amplifier 24, and appears on output conductor 26 of amplifier 24 as a signal generally designated 26' in Fig. 2. The recorded timing pulses on track 15 and the recorded digits on track 16 are synchronously related to each other, as is shown in Fig. 2. The necessity for having this synchronous relationship will become apparent later in this disclosure.

Signal 26' is applied to the input of flip-flop 28, each positive pulse of signal 26' triggering flip-flop 28 into producing a high voltage level on output conductor 30, and each negative pulse thereof triggering flip-flop 28 into producing a low voltage level on conductor 30. Flip-flop 28 may be of the type illustrated on page 97 of "Electronics" by Elmore and Sands, published in 1948 by McGraw-Hill Book Co., Inc., and its output signal is designated generally as 30' in Fig. 2. As will be observed, signal 30' is a voltage level representation of the magnetized areas on track 16, that is the two voltage levels represent the two directions of magnetization, respectively.

Signal 30' from flip-flop 28 and signal 22' from blocking oscillator 21 are impressed on the two inputs of an "and" gate 31, respectively. If the high voltage level of flip-flop 28 is impressed on gate 31 at the same instant a timing pulse is applied thereto, the gate passes the timing pulse. On the other hand, the gate blocks any timing pulse applied thereto at the instant flip-flop 28 is producing its low voltage level signal. Thus, first timing pulse **22*a* of signal 22' is blocked by gate 31, as, at its initiation, a low voltage level signal appears on conductor 30. However, a second timing pulse 22*b* is passed by the gate, as illustrated by pulse 32*b* of signal 32' since, at its initiation, a high voltage level signal 30*a* appears on conductor 30. The derivation of the remaining pulses of signal 32' may be likewise understood by comparing the remaining corresponding portions of signals 22' and 30'. The structure of "and" gate 30** is set forth in Fig. 3, and its mode of operation is presented in connection therewith.

Unit 10 consists of a bistable multivibrator or flip-flop circuit 33 and a triggering circuit 44. Flip-flop 33 comprises two triodes 34 and 35, the plates of which are connected to the B+ terminal of a source of direct-current potential, not shown, through resistors 36 and 37, respectively, the cathodes of triodes 34 and 35 being mutually grounded. The grids of triodes 34 and 35 are connected together through grid resistors 38 and 39, respectively, the common junction of resistors 38 and 39 being connected to ground through a grid biasing battery 40. The plate of triode 34 is connected to the grid of triode 35 through a parallelel resistor and capacitor combination 41, while the plate of triode 35 is connected to the grid of triode 34 by a similar paralleled resistor and capacitor combination 42.

For understanding the flip-flop's principle of operation, assume that triode 34 is conducting and triode 35 is non-conducting, its grid being biased to cutoff. If a sharp negative pulse is applied to the grid of triode 34, its conduction is interrupted resulting in a rise of its plate potential. This increase of plate potential is coupled to the grid of triode 35 through the capacitor and resistor combination 41, thereby raising the grid potential of tube 35 above cutoff, and initiating a plate current flow within triode 35. The plate conduction of triode 35 lowers its plate potential which, in turn, is coupled back to the grid of triode 34 resulting in a further reduction of the plate current of triode 34. This interaction between the two triodes continues in a substantially instantaneous fashion until a stable condition is reached, at which time triode 34 is nonconducting and triode 35 is fully conducting. If, after the stable condition is attained, a negative pulse were applied to the grid of triode 35, another reversal of the conducting states would be effected, similar to that explained above, due to the symmetry of the circuit, and triode 34 would again be conducting and triode 35 non-conducting. Thus, negative pulses applied to triode 34 trigger flip-flop 33 so that triode 34 assumes its non-conducting state and a high voltage level signal appears on its plate electrode, whereas negative pulses applied to the grid of triode 35 effect a reverse conduction state of the flip-flop, and a low voltage level signal appears on the plate electrode of triode 34.

The grid of triode 34 is coupled to output conductor 32 of "and" gate 31 through a coupling capacitor 43, and receives therefrom the output signal 32' of the gate. The grid of triode 35 is coupled to output conductor 22 of blocking oscillator 21 through triggering network 44 comprising a serially connected diode 47, and a differentiating network including a series capacitor 45 and shunt resistor 46. Signal 22' is applied to the input of triggering network 44, and resistor 46 and capacitor 45 differentiate the leading and trailing edges of each pulse of signal 22' into sharp negative and positive pulses, respectively. Diode 47 has its anode connected to the grid of triode 35 so that diode 47 passes only the negative differentiated pulses. Each negative differentiated pulse passed is much sharper than the original pulse received from oscillator 21, since the differentiated pulse is derived from the earlier portion or leading edge of the original pulse. The output signal from triggering network 44, as applied to the grid of triode 35, is designated generally as 44′ in Fig. 2.

Signal 32′ is impressed on the grid of triode 34, and signal 44′ is impressed on the grid of triode 35. Flipflop 33 will be triggered by a pulse in signal 44′ unless pulses are applied simultaneously to both grids, in which case it will be triggered by the pulse in signal 32′. Stated differently, if pulses of signals 32′ and 44′ are applied simultaneously to the grids of triodes 34 and 35, respectively, the pulse applied to triode 34 overrides the pulse applied to triode 35, and actuates the flip-flop, since the pulses of signal 44′ are much sharper than the pulses of signal 32′. Hence, after termination of each pulse of signal 44′, the pulse of signal 32′ continues and provides the final triggering energy to the flip-flop.

The output signal, generally designated 49′, in Fig. 2 of unit 10 is derived from the plate of triode 34, and appears on a conductor 49. As has been previously stated, triggering pulses applied to the grid of triode 34 produce a high voltage level signal on output conductor 49, while triggering pulses applied to the grid of triode 35 produce a low voltage level signal thereon. Thus, the first pulse 44*a* of signal 44′ triggers flip-flop 33 so that a low voltage level signal 49*a* is initially produced. A pulse 32*b* from "and" gate 31 occurs simultaneously with the next successive pulse 44*b* from triggering circuit 44, and by overriding pulse 44*b*, triggers flip-flop 33 into producing a high voltage level signal 49*b*. High voltage level signal 49*b* is then changed into a low voltage level signal 49*c* by the triggering of flip-flop 33 by the next timing pulse 44*c*. The remaining portion of signal 49′, as illustrated, is formed in a similar manner. As will be noted, signal 49′ is identical to output signal 30′ of flip-flop 28, but is delayed with respect thereto for a period of time equal to a timing pulse period, that is a period of time equal to the interval between successive timing pulses.

The next stage of the shifting register comprises a unit 50, identical to unit 10 and actuated in a like manner. Output conductor 49 of unit 10 is connected to one input terminal of an "and" gate 51 which is identical to "and" gate 31. The other input terminal of gate 51 is connected to output conductor 22. Output conductor 52 of gate 51 is connected to the input terminal of unit 50, conductor 52 corresponding to output conductor 32 of gate 31. The other input terminal of unit 50 is connected directly to conductor 22 to receive timing pulses therefrom.

The operation of unit 50, with respect to input pulses delivered thereto from gate 51 and oscillator 21, is identical to the operation set forth for unit 10. The signal output of unit 50 is generally designated 53′ in Fig. 2, and appears on output conductor 53. Signal 53′ is identical to output signal 49′ of unit 10, but is delayed one timing pulse period therefrom in the same manner that signal 49′ was delayed one timing pulse period from a signal 30′ of flip-flop 28.

The first three stages of a shifting register have been illustrated, the stages being flip-flop 28, unit 10, and unit 50. The shifting register will, at any instant, produce three signals on its three consecutive output terminals, the signals representing three digits in the same order as they were originally recorded on track 16. Upon impression of each signal representing a new binary digit on the first flip-flop 28, each of the remaining digits represented by the output signals of the successive flip-flops is shifted one place down the register to be represented by the output signal of the next following unit. A shifting register thus stores a group of binary digits in sequential form as signals, the number of digits stored being equal to the number of its stages. The stored digits may be removed sequentially, in the same order as originally stored, from the shifting register by inserting new digits sequentially into the first flip-flop of the register.

This shifting register may be transformed into a circulating register of the type utilized in the digital computer art by coupling the output of the final flip-flop to the input of the first flip-flop. With this accomplished, each of the digits thus stored is transferred to the next immediate flip-flop of the closed loop upon occurrence of a timing pulse.

Figure 3:
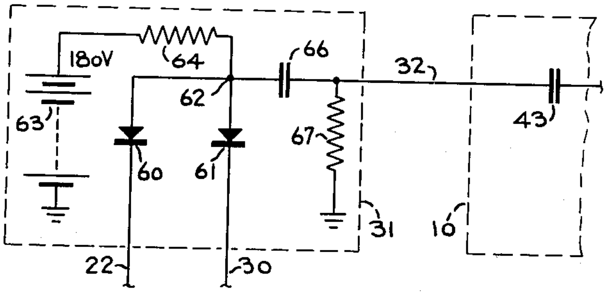
Fig. 3 is a circuit diagram of an "and" gate used in Fig. 1.

Fig. 3 is a circuit diagram of "and" gate 31, signals 22′, 30′, 32′ and 62′ of Fig. 2 illustrating the mode of operation of gate 31. The two input conductors 22 and 30 are connected through diodes 60 and 61, respectively, to a common junction point 62. The positive terminal of a battery 63 is likewise connected to point 62 through a high resistor 64, while output conductor 32 is connected to point 62 through a series capacitor 66 and to ground through a shunt resistor 67. Battery 63, for the purposes of this explanation, has a potential magnitude of 180 volts while signal 22′ is normally 140 volts and drops to 125 volts during each timing pulse. The output signal 30′ of flip-flop 28 has been assigned a value of 125 volts for the low voltage level and 140 volts for the high voltage level.

In operation, if the potential of signal 30′ is at 125 volts, a current flows from battery 63 through resistor 64 and the forward resistance of diode 61. The potential at point 62 and across capacitor 66 is accordingly maintained at 125 volts, assuming a negligible forward resistance of diode 61. If signal 22′ is at its 140 volt level during the period that signal 30′ is at 125 volts, diode 60 is back-biased and blocks signal 22′ from point 62. The timing pulses of signal 22′ likewise have no effect on the potential of point 62, since the potential of point 62, under the stated conditions, is 125 volts, the magnitude of each timing pulse.

Upon actuation of flip-flop 28 into its high voltage level of 140 volts, that is the first level 30*a* of signal 30′, diode 61 is initially back-biased due to the 125 volt potential across capacitor 66 and remains in that condition until capacitor 66 charges from battery 63 to 140 volts. The charging current flows through resistors 64 and 67 thereby effecting an exponential rise of the potential across capacitor 66 and point 62. Resistor 64 is considerably larger than resistor 67 to limit the charging rate and is of such a value that capacitor 66 will be substantially fully charged between successive timing pulses 22*a* and 22*b*, as is illustrated by charging pulse 62*a* of signal 62′ appearing on point 62. Thus, charging pulse 62*a* illustrates the potential rise of point 62 when the potential appearing on conductor 30 rises from 125 to 140 volts. Upon occurrence of the next successive timing pulse 22*b*, the signal level on conductor 22 falls to 125 volts thereby electrically connecting point 62 thereto through the forward resistance of diode 60. This immediately initiates a discharge of capacitor 66 through the relatively low valued resistor 67, the discharge continuing for the duration of pulse 22*b*. The discharge current produces a potential drop across resistor 67, this potential drop being designated by pulse 32*b* of output signal 32′. The potential magnitude of this pulse 32*b* is determined by several factors, such as the values of resistors 64 and 67 and condenser 66, and is accordingly, not given a specific value in this example.

Figure 4:
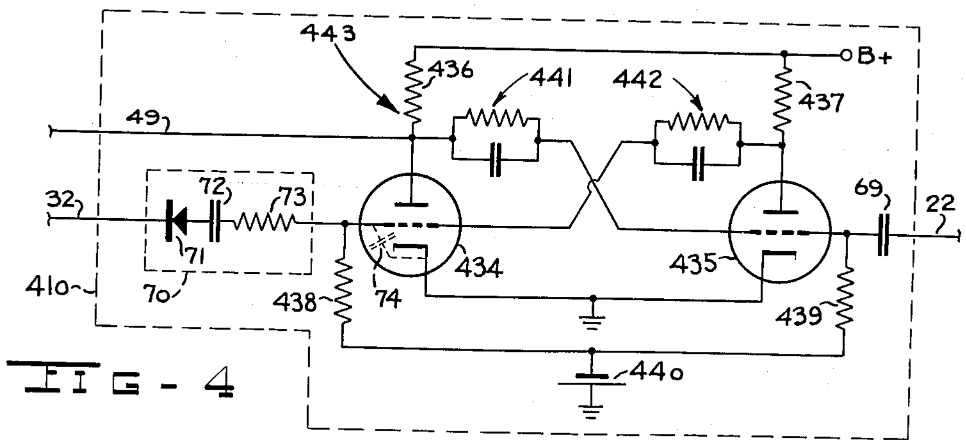
Fig. 4 is a circuit diagram of another embodiment of this invention.
Figure 5:
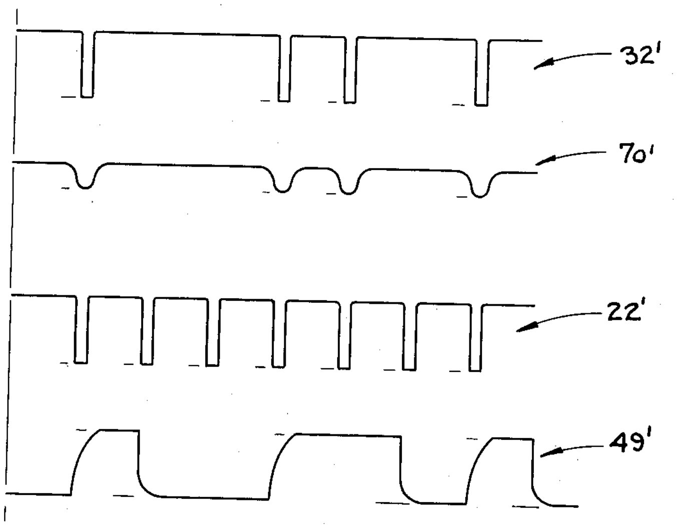
Fig. 5 is a group of signal waveforms illustrating the operation of the embodiment of Fig. 4.

In Fig. 4, there is illustrated another embodiment, a triggering network, of this invention. Only that portion of the shifting register which differs from Fig. 1 is illustrated in Fig. 4, said portion consisting of unit 410. Unit 410 corresponds to unit 10 of Fig. 1 and includes a flip-flop 433 similar to flip-flop 33 of unit 10 both as to structure and operation. The timing pulses appearing on the output conductor 22 of blocking oscillator 21, generally designated 22′ in Fig. 5, are applied to the grid of triode 435 through a coupling capacitor 69. The output signal of "and" gate 31, appearing on conductor 32 and generally designated 32′ in Fig. 5, is applied through triggering circuit 70 to the grid of triode 434. Signals 22′ and 32′ in Fig. 5 are identical to the like designated signals in Fig. 2. Triggering circuit 70 comprises serially connected diode 71, coupling capacitor 72 and resistor 73. Resistor 73 acts in conjunction with grid resistor 438 and the normal grid-to-cathode capacitance 74, herein shown dotted, of triode 434 as an integrating circuit to lengthen the time duration of any negative pulses applied thereto from conductor 32. Each negative pulse of signal 32′ is applied through diode 71 and coupling capacitor 72 to charge up the tube capacitance 74 through series resistor 73 in an exponential manner. The value of series resistor 73 is so related to the inter-electrode capacitance 74 that capacitance 74 is substantially fully charged at the termination of each negative pulse. Upon termination of the negative pulse, capacitance 74 discharges through grid resistor 438 and thereby maintains a potential on the grid of triode 434 until the completion of the discharge. Consequently, the negative pulse applied to the triggering circuit is impressed on the grid of tube 434 as a pulse lasting for a time interval equal to its own duration plus the inter-electrode capacity discharge duration.

Signal 70′ of Fig. 5 illustrates the final input signal to the grid of tube 434 after the lengthening operation performed by circuit 70 on each negative pulse of input signal 32′. In this embodiment, if identical pulses appear simultaneously on conductors 22 and 32, the subsequent spreading or lengthening of the pulse on conductor 32 by triggering unit 70 allows the lengthened pulse to override the pulse from conductor 22, and trigger flip-flop 433 accordingly. As in the embodiment of Fig. 1, if a pulse is applied to the flip-flop only from conductor 22, the flip-flop is triggered. Thus, the result obtained by the circuit of Fig. 4 is identical to that obtained in Fig. 1, the difference in operation being that, in Fig. 1, the pulses on conductor 22 are sharpened so that normal pulses appearing on conductor 32 will override the sharpened pulses and trigger the flip-flop, whereas, in Fig. 3, the pulses on conductor 32 are lengthened so as to override any normal pulses simultaneously appearing on conductor 22.

Diode 71, in this embodiment, serves several functions. It accentuates the pulse spreading by providing a high-back resistance to the discharge of any charge initially placed by an incoming negative pulse on capacitor 72. This, in turn, delays the discharge of capacitor 72, and accordingly, maintains the potential applied to the grid of tube 434 for a period beyond the termination of the incoming negative pulse. Diode 71 also prevents any positive pulse, inadvertently appearing on conductor 32, from being applied to the grid of triode 434 with the consequent undesired triggering thereof.

The pulse lengthening effect just described may be accentuated by making capacitor 69 of a sufficiently small magnitude that capacitive division takes place between it and the grid-cathode capacitance of triode 435. Such a division decreases the magnitude and effective duration of pulses applied to the flip-flop from conductor 22 thus enhancing the overriding effect of lengthened pulses simultaneously applied to the grid of triode 434 from triggering network 70. As is also apparent, a capacitor may be coupled in parallel to the inter-electrode capacitance 74 so as to provide additional capacitance for the integrating circuit.

Figure 6:
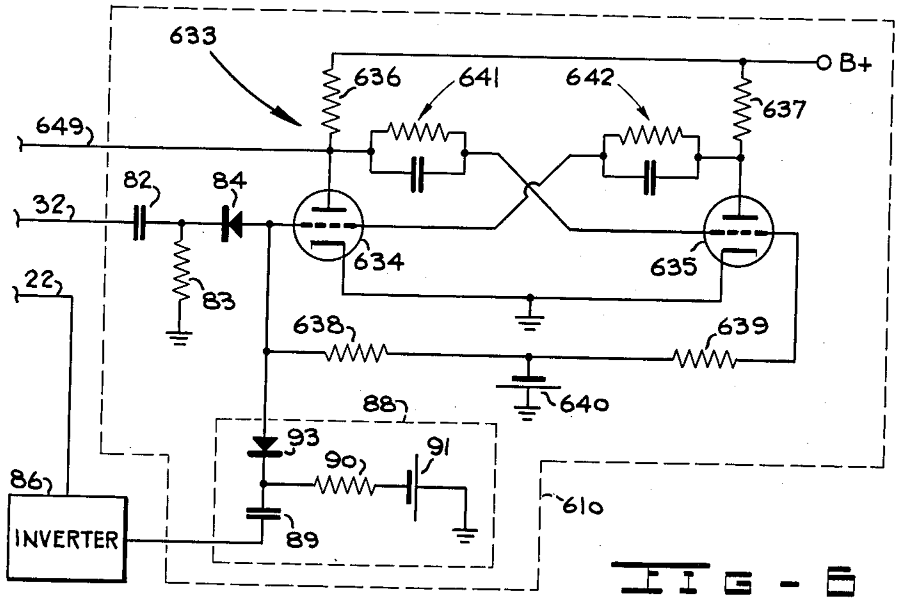
Fig. 6 is a circuit diagram of another embodiment of this invention.

In Fig. 6, there is illustrated still another embodiment of a triggering network according to this invention. In this embodiment, as in the embodiment of Fig. 4, only that portion of the shifting register is illustrated which differs from the circuit of Fig. 1, said portion including a unit 610 corresponding to unit 10 of Fig. 1, and an inverter 86.

The negative pulses appearing on conductor 32 are coupled serially to the grid of triode 634 through a coupling capacitor 82 and a diode 84 having its cathode connected to the grid of triode 634. A shunt resistor 83 is connected between ground and the junction of diode 84 and capacitor 82. The negative timing pulses appearing on output conductor 22 are applied to an inverter 86, of conventional type, which inverts each pulse thus applied to produce on its output terminal, a corresponding positive pulse. The output of inverter 86 is coupled to the grid of triode 634 through a triggering network 88. Network 88 includes a differentiating circuit comprising a series capacitor 89 and a shunt resistor 90 connected to the negative terminal of a battery 91, the positive terminal of battery 91 being grounded. The differentiating circuit is connected to the grid of triode 634 through a diode 93.

Figure 7:
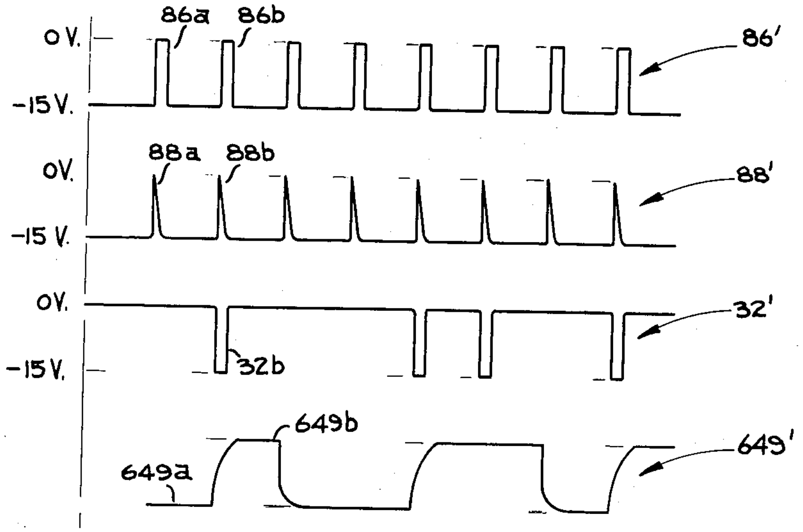
Fig. 7 is a group of signal waveforms illustrating the operation of the embodiment of Fig. 6.

The operation of the circuit of Fig. 6 may be most readily understood by referring to the signals illustrated in Fig. 7. In order to facilitate the explanation of the operation of this embodiment, the signals have been assigned arbitrary values. The output signal of inverter 86 is designated generally as 86′ in Fig. 7, and comprises a positive pulse of 15 volts magnitude for each negative pulse applied thereto from conductor 22. The potential of battery 91 is 15 volts, and thus maintains the base of signal 86′ at a value of 15 volts negative, signal 86′ rising to 0 volts for each positive pulse. The differentiating circuit, comprising condenser 89 and resistor 90 within triggering network 88, differentiates each pulse applied thereto from inverter 86, only the positive portion of each differentiated pulse is conducted by diode 93 to the grid of triode 634. The signal applied by network 88 to the grid of triode 634 is designated generally as 88′ in Fig. 7. The differentiated pulses also rise from −15 volts to 0 volts in magnitude, but are of much shorter time duration than the pulses of signal 86′.

The coupling capacitor 82 and resistor 83 couple signal 32′, appearing on conductor 32, to the grid of triode 634. Signal 32′, measured across resistor 83, is normally at a voltage level with its negative pulses extending to minus 15 volts.

The circuit parameters of the flip-flop of Fig. 6 may be so chosen, for the purposes of this example, that the grid of triode 634 is maintained at −15 volts when triode 634 is non-conducting and producing its high level output signal and is maintained at 0 volts when the triode 634 is conducting and producing its low level output signal. A single positive differentiated pulse applied from network 88 to the grid of triode 634, when triode 634 is non-conducting, raises the grid potential thereof from −15 to 0 volts and triggers the flip-flop 633 into producing its low level output signal on output conductor 649. During the production of the low voltage level, diode 93 is back-biased by the 15 volts differential between the 0 potential on the grid of triode 634 and the negative potential produced by battery 91. Accordingly, the back-biasing of diode 93 results in an electrical separation between the remaining portions of triggering network 88 and the grid of triode 634. If now, another pulse were to be applied to triggering network 88 from inverter 86, the pulse would have no effect on the triode's conduction state as it would not overcome the magnitude of this back-biasing potential.

If, however, a negative pulse 32*b* of signal 32′, is applied from conductor 32 when triode 634 is in its conducting state at the time a positive pulse 88*b* is applied simultaneously thereto from triggering network 88, the negative pulse reduces the grid potential below the 0 potential level. Accordingly, a portion of the positive pulse from network 88 is conducted through diode 93 to the grid of triode 634. The result is an initial bucking out of the two pulses with the negative pulse eventually prevailing since its time duration is greater than that of the differentiated positive pulse. The flip-flop 633 is accordingly triggered by the negative pulse so that triode 634 is non-conducting and produces the high voltage level signal on output conductor 649 as is illustrated by level 649b of signal 649'. In this new conduction state, the grid of triode 634 is maintained at minus 15 volts, thereby back-biasing diode 84 to isolate conductor 32 from the grid of triode 634.

Diode 84 is back-biased for the entire period during which a positive pulse from triggering network 88 is applied to the grid of triode 634 if no corresponding negative pulse appears on conductor 32. This isolates the circuitry to the left of diode 84 from the positive pulse, and thus prevents this circuitry from having any undesirable effect on the rise time, etc. of the positive pulse.

Another embodiment may be formed similar to Fig. 6 by omitting triggering circuit 88 and placing a triggering circuit, similar to circuit 70 of Fig. 4 serially between output conductor 32 and the grid of triode 634. In such an embodiment, circuit 70 would lengthen the time duration of any pulse on conductor 32 and the resulting elongated pulse would override any simultaneously applied positive pulse from inverter 86 of normal duration.

The embodiment of Fig. 6 has an operational advantage over the embodiments disclosed in connection with Figs. 1 and 4 in that both input signals are applied to the same flip-flop grid rather than separately to different grids. In applying the input signals to different grids, the interaction between the two signals, resulting in one signal overriding the other, takes place through the flip-flop circuit which involves the amplification factors of the tubes, time constants of the R-C plate-to-grid coupling circuits, etc. In such embodiments, there is always the possibility that the flip-flop will be triggered momentarily into the undesired state before the overriding pulse gains final control and triggers the flip-flop into the desired state. When, however, both input signals are coupled to the same grid, as in Fig. 6, the interaction between the two signals is direct without involving the flip-flop circuit, and the possibility of the flip-flop being triggered momentarily into the undesired state is greatly reduced.

As will be apparent to those skilled in the art, the particular flip-flop circuit illustrated may take other known forms without departing from the spirit and scope of this invention. Also, the flip-flops of this invention may be triggered through their plate or cathode circuits, as well as their grid circuits as is specifically herein illustrated, without departing from the spirit and scope of this invention.

What is claimed as new is:

1. A bistable flip-flop and triggering unit comprising: a bistable flip-flop; first means for applying pulses along a first path to said flip-flop, said flip-flop being responsive to the pulses applied thereto from said first means for producing a first output signal level; second means for applying pulses along a second path to said flip-flop, said flip-flop being responsive to the pulses applied thereto from said second means for producing a second output signal level; and pulse-shaping means conductively coupled in said second path to vary the time duration of pulses applied from said second means to said flip-flop whereby, upon simultaneous application of pulses from said first and second means, said flip-flop is responsive to the pulse applied from only one of said means.

2. In combination with a bistable flip-flop, a device for rendering said flip-flop responsive to one of two input pulses applied simultaneously thereto, said device comprising: electronic pulse-shaping means for varying the time duration of one of the input pulses applied to said flip-flop whereby one input pulse overrides the other input pulse and is solely effective in triggering said flip-flop.

3. A bistable flip-flop device comprising: a bistable flip-flop having input and output ends; means for applying first pulses to said input end, said flip-flop being responsive to said first pulses for producing a first signal level on said output end; means for applying second pulses to said input end, said flip-flop being responsive to said second pulses for producing a second signal level on said output end; and pulse distorting means for varying the time duration of pulses applied from the last-named means to said input end whereby said flip-flop is responsive to only one pulse when one of said first pulses and one of said second pulses are applied simultaneously to said input end.

4. A device for rendering a bistable flip-flop having two input circuits responsive to a signal applied to one input circuit upon simultaneous application of signals to both of said input circuits, respectively, said device comprising: electrical signal-shaping means having input and output circuits, said signal-shaping means being responsive to signals applied to the input circuit thereof for producing pulses on the output circuit thereof having a different time duration from that of the input signals; and means for conductively coupling the output circuit of said signal-shaping means to one of the input circuits of said flip-flop.

5. The device defined in claim 4 wherein said electrical signal-shaping means includes a differentiating circuit for shortening the time duration of the signals applied to the input circuit thereof.

6. The device defined in claim 5 wherein said coupling means includes rectifying means for blocking signals of a predetermined polarity from the one input circuit of said flip-flop.

7. The device defined in claim 4 wherein said electrical signal-shaping means includes an integrating circuit for lengthening the time duration of signals applied to the input circuit thereof.

8. The device defined in claim 7 wherein said electrical signal-shaping means further includes rectifying means for further lengthening the signals applied to the input circuit thereof.

9. A flip-flop device comprising: a bistable flip-flop having an input circuit, said flip-flop being responsive to positive and negative pulses applied to said input circut for triggering into first and second potential states, respectively; means for varying the time duration of a pulse; and means conductively coupling the last-named means to said input circuit whereby upon simultaneous application of pulses of opposite polarity to said last-named means and said input circuit, respectively, said flip-flop is triggered by only one of said pulses.

10. The device defined in claim 9 wherein said last-named means includes a differentiating circuit for shortening the time duration of pulses applied thereto.

11. A device for rendering a bistable flip-flop having an input circuit responsive to an input pulse of one polarity applied to said input circuit upon simultaneous application of input pulses of opposite polarities to said input circuit, said device comprising: electrical pulse-shaping means having input and output circuits, said pulse-shaping means being responsive to pulses applied to the input circuit thereof for producing pulses on the output circuit thereof having a different time duration from that of the input pulses applied thereto; means for applying input pulses of one polarity to the input circuit of said pulse-shaping means; means for applying the pulses appearing on the output circuit of said pulse-shaping means to the input circuit of said flip-flop; and means for applying the pulses of the other polarity to the input circuit of said flip-flop.

12. A shifting register circuit for storing a series of binary digits in the form of a series of voltage levels, respectively, said circuit comprising: a first bistable flip-flop having an input and an output circuit, said first flip-flop being responsive to pulses applied to said input circuit for producing signals of two voltage levels across said output circuit, respectively; means for producing a series of spaced timing pulses, each two consecutive timing pulses being spaced a predetermined time interval apart; means for producing a series of pulses representing a sequence of binary digits, each of the binary digit pulses occurring simultaneously with a timing pulse; means for applying said binary digit pulses to said input circuit to actuate said flip-flop whereby a first series of voltage levels is produced across said output circuit representing the sequence of said binary digits, respectively; gating means having two input ends and one output end; means for applying said series of timing pulses to one input end of said gating means; means for applying said first series of voltage levels to the other input end of said gating means, said gating means being responsive to one of said voltage levels for passing said timing pulses to said output end and responsive to the other of said voltage levels for blocking said timing pulses from said output end; a second bistable flip-flop having input and output means, said second flip-flop being responsive to pulses applied to said input means for producing signals of two voltage levels, respectively, on said output means; means for applying the timing pulses appearing on the output end of said gating means to the input means of said second flip-flop; means for applying the series of timing pulses produced by the timing pulse producing means to the input means of said second flip-flop; and pulse-shaping means for varying the time duration of the timing pulses applied to the input means of said second flip-flop from one of the two last-named means whereby said second flip-flop is responsive to only one of two pulses simultaneously applied to its input means to produce a second series of voltage levels on its output means, said second series of voltage levels representing the series of said binary digits, respectively, and being delayed from said first series by said predetermined time interval.

13. A shifting register circuit for storing a series of pulses representing binary digits, respectively, as a series of potential levels, respectively, said register circuit comprising: flip-flop means having an input and an output circuit; means for applying the series of binary pulses to said input circuit, said flip-flop means being responsive to said series of binary pulses for producing a series of first and second potential levels on said output means, said series of first and second potential levels representing the series of binary pulses, respectively; means for producing a series of timing pulses, said timing pulses having synchronous relationship with said binary pulses; a series of bistable flip-flops, each of said flip-flops having input and output means and alternately producing first and second potential levels on the output means thereof in response to pulses applied to the input means thereof; a series of gating means, one for each flip-flop, each of said gating means having first and second input terminals and an output terminal; means conductively coupling the output circuit of said flip-flop means to the first input terminal of the gating means associated with the first flip-flop of said series of flip-flops; means conductively coupling the output means of each of said series of flip-flops except the final flip-flop to the first input terminal of the gating means associated with the next following flip-flop of said series of flip-flops; means conductively coupling the timing pulse producing means to the second input terminal of each of said gating means, each of said gating means being responsive to one of said first and second potential levels applied to the first input terminal thereof for passing the timing pulses applied to the second input terminal thereof to the output terminal thereof; means conductively coupling the output terminal of each of said gating means to the input means of the associated flip-flop; means conductively coupling said timing pulse producing means to the input means of each of said flip-flops; and means conductively coupled to the input means of each of said flip-flops for varying the time duration of the input pulses applied thereto from one of the two last-named means whereby each of said flip-flops is responsive to only one of simultaneously applied pulses from said timing pulse producing means and the associated gating means for producing one of said first and second potential levels on the output means associated therewith, the series of potential levels appearing on the output means of the series of said flip-flop representing the series of binary digits, respectively.

14. In a shifting register, the combination comprising: a first flip-flop responsive to an applied electrical signal for producing an output signal having two voltage levels; a second flip-flop having first and second input circuits and producing an output signal having two voltage levels; first means for continuously applying pulses to said first input circuit; second means responsive to the output signal of said flip-flop for applying pulses to said second input circuit; and a pulse-shaping network in one of said input circuits for varying the time duration of pulses applied from one of said means to said second flip-flop with respect to the time duration of pulses applied from the other of said means to said second flip-flop, whereby upon simultaneous application of pulses from said first and second means, said second flip-flop is responsive only to the pulses applied to said second input circuit.

15. A shifting register comprising a series of flip-flops connected in cascade, each of said flip-flops including first and second input circuits and producing a bilevel output signal; first means for continuously applying pulses to each of said first input circuits; a corresponding series of pulse-applying means interconnecting said flip-flops, each of said pulse-applying means being responsive to the bilevel signal of an associated flip-flop for applying a pulse to the second input circuit of the following flip-flop in said series; and pulse-shaping means in one input circuit of each of said flip-flops for varying the time duration of the pulse applied to said one input circuit with respect to the time duration of the pulse applied to the other of said input circuits, whereby upon simultaneous application of pulses to the input circuits of a flip-flop, the flip-flop is responsive only to the pulse applied by the corresponding pulse-applying means.

References Cited in the file of this patent

UNITED STATES PATENTS 2,580,771 Harper ------------------ Jan. 1, 1952

OTHER REFERENCES

"Gate-Type Shifting Registers," by J. H. Knapton et al., Electronics, December, 1949; pages 186–190.